United States Patent
Brugger

(10) Patent No.: US 12,502,732 B2
(45) Date of Patent: *Dec. 23, 2025

(54) METHOD FOR WELDING COATED STEEL SHEETS

(71) Applicant: VOESTALPINE AUTOMOTIVE COMPONENTS LINZ GMBH & CO. KG, Linz (AT)

(72) Inventor: Gerald Brugger, Linz (AT)

(73) Assignee: Voestalpine Automotive Components Linz GmbH & Co. KG, Linz (AT)

( * ) Notice: Subject to any disclaimer, the term of this patent is extended or adjusted under 35 U.S.C. 154(b) by 838 days.

This patent is subject to a terminal disclaimer.

(21) Appl. No.: 17/780,082

(22) PCT Filed: Nov. 26, 2020

(86) PCT No.: PCT/EP2020/083534
§ 371 (c)(1),
(2) Date: May 26, 2022

(87) PCT Pub. No.: WO2021/105297
PCT Pub. Date: Jun. 3, 2021

(65) Prior Publication Data
US 2022/0410316 A1    Dec. 29, 2022

(30) Foreign Application Priority Data

Nov. 26, 2019  (DE) ............... 10 2019 131 906.4

(51) Int. Cl.
*B23K 26/322*  (2014.01)
*B23K 26/06*   (2014.01)
(Continued)

(52) U.S. Cl.
CPC ........ *B23K 26/322* (2013.01); *B23K 26/0613* (2013.01); *B23K 26/0876* (2013.01); *B23K 26/24* (2013.01); *B23K 2103/04* (2018.08)

(58) Field of Classification Search
CPC ............ B23K 2103/04; B23K 26/24; B23K 26/0876; B23K 26/0613; B23K 26/322
(Continued)

(56) References Cited

U.S. PATENT DOCUMENTS 10,328,513 B2   6/2019 Lin et al.
2003/0150842 A1* 8/2003 Mikame ............ B23K 26/0604
                                                  219/121.6
(Continued)

FOREIGN PATENT DOCUMENTS

CA      2335546 A1    1/2000
CN   105414759 A  *  3/2016   ............ B23K 26/24
(Continued)

OTHER PUBLICATIONS

Yang et al., "Microstructure and property of rotary double-focus laser-TIG hybrid welding of 304 stainless steel", Wen yang ; Wang Su; Li Xiaohui, Laser technology, vol. 33 Issue 06, pp. 593-596 (2009) (English Abstract).
(Continued)

*Primary Examiner* — Jimmy Chou
(74) *Attorney, Agent, or Firm* — Maxwell J. Petersen; FisherBroyles, LLP

(57) ABSTRACT

A method for welding coated steel sheets, particularly steel sheets that are coated with an aluminum-silicon metallic coating layer, is provided. A configuration of two laser beams is provided, wherein the laser beams act on a weld pool that is to be formed, at least one laser beam rotates around a rotation axis so that the laser beams execute a movement relative to each other, and the laser beams are guided along a welding axis. In order to achieve a mixing of the weld pool, a defined stirring effect and a defined welding
(Continued)

speed in relation to each other are adhered to, wherein a mathematically defined condition applies to the stirring effect.

19 Claims, 9 Drawing Sheets

(51) Int. Cl.
    *B23K 26/08*     (2014.01)
    *B23K 26/24*     (2014.01)
    *B23K 103/04*     (2006.01)

(58) Field of Classification Search
    USPC .................................................. 219/121.64
    See application file for complete search history.

(56) References Cited

U.S. PATENT DOCUMENTS

| | | | |
|---|---|---|---|
| 2014/0186655 A1 | 7/2014 | Okita et al. | |
| 2014/0263207 A1* | 9/2014 | Liu | B23K 26/323 219/121.61 |
| 2016/0016261 A1* | 1/2016 | Mudd, II | B23K 26/044 219/121.64 |
| 2018/0021888 A1* | 1/2018 | Liu | B23K 26/035 219/121.64 |
| 2018/0361506 A1* | 12/2018 | Tateyama | B23K 26/704 |
| 2020/0353983 A1* | 11/2020 | Alvarez | C21D 9/505 |
| 2022/0410314 A1* | 12/2022 | Brugger | B23K 26/242 |
| 2022/0410316 A1 | 12/2022 | Brugger | |

FOREIGN PATENT DOCUMENTS

| | | | | |
|---|---|---|---|---|
| CN | 110170742 A | | 8/2019 | |
| DE | 102013101953 A1 | | 8/2014 | |
| DE | 102014107716 B3 | | 6/2015 | |
| DE | 102015106339 A1 | * | 10/2016 | ........... B23K 26/073 |
| DE | 202015009465 U1 | | 1/2018 | |
| DE | 102018107291 A1 | | 10/2019 | |
| EP | 1112804 A | | 7/2001 | |
| EP | 3441178 A1 | | 2/2019 | |
| EP | 3536438 A1 | | 9/2019 | |
| JP | 2001329334 A | | 3/2001 | |
| JP | 2002329334 A | | 3/2001 | |
| JP | 2018107636 A | | 11/2018 | |
| JP | 2018187636 A | * | 11/2018 | ......... B23K 26/0608 |
| WO | WO-2015107664 A1 | * | 7/2015 | ......... B23K 26/0622 |
| WO | WO-2016194322 A1 | * | 12/2016 | ......... B23K 26/0643 |
| WO | 20171031549 A1 | | 6/2017 | |
| WO | WO-2017103149 A1 | * | 6/2017 | ......... B23K 26/0608 |
| WO | 2022078798 A1 | | 4/2022 | |

OTHER PUBLICATIONS

Office Action in Chinese Patent Application 2020800916670, dated Jan. 18, 2025.
International Search Report for PCT/EP2020/083534.
Office Action for DE102019131906.4, dated Sep. 23, 2020.
Office Action in corresponding Chinese Application 202080091667.0, dated May 14, 2025.

* cited by examiner

| | $v_w$ [m/min] | $d_f$ [mm] | $x_{df}$ [mm] | $x_{off}$ [mm] | n [mm-1] | P [kW] | Weld seam homogeneity | Process stability | |
|---|---|---|---|---|---|---|---|---|---|
| T1 | 6 | 0.3 | 0 | 0 | 0 | 3 | − | | not according to the invention |
| T2 | 6 | 0.3 | 0.9 | 0.45 | 4.125 | 4.3 | − | | according to the invention |
| T3 | 6 | 0.3 | 0.9 | 0.45 | 20 | 5.5 | + | | according to the invention |
| T4 | 6 | 0.3 | 0.9 | 0.45 | 2 | 3.8 | − | | not according to the invention |
| T5 | 10 | 0.3 | 0.9 | 0.45 | 11.4 | 6.5 | + | | according to the invention |
| T6 | 8 | 0.3 | 0.9 | 0.45 | 25 | 6 | n.a. | unstable | not according to the invention |
| T7 | 8 | 0.3 | 0.9 | 0.35 | 4.125 | 4.3 | − | | according to the invention |
| T8 | 6 | 0.3 | 0.9 | 0.35 | 20 | 5.5 | − | | according to the invention |
| T9 | 6 | 0.3 | 0.9 | 0.35 | 2 | 3.8 | n.a. | unstable | not according to the invention |
| T10 | 10 | 0.3 | 0.9 | 0.35 | 11.4 | 6.5 | − | | according to the invention |
| T11 | 8 | 0.3 | 0.9 | 0.35 | 25 | 6 | n.a. | unstable | not according to the invention |
| T12 | 6 | 0.3 | 0.9 | 0 | 4.125 | 4.3 | − | | according to the invention |
| T13 | 6 | 0.3 | 0.9 | 0 | 20 | 5.5 | − | | according to the invention |
| T14 | 6 | 0.3 | 0.9 | 0 | 2 | 3.8 | − | | not according to the invention |
| T15 | 10 | 0.3 | 0.9 | 0 | 11.4 | 6.5 | − | | according to the invention |
| T16 | 6 | 0.3 | 0.4 | 0.2 | 4.125 | 4 | − | | according to the invention |

Fig. 4

METHOD FOR WELDING COATED STEEL SHEETS

RELATED APPLICATIONS

This patent application is a 35 U.S.C. § 371 National Stage entry based on and claiming priority to International Application PCT/EP2020/083534, filed on Nov. 26, 2020, which in turn claims priority based on German Patent Application DE 10 2019 131 906.4, filed on Nov. 26, 2019, the disclosures of which are incorporated herein by reference in their entireties.

FIELD OF THE INVENTION

The invention relates to a method for welding coated steel sheets as described and claimed herein.

BACKGROUND OF THE INVENTION

In automotive engineering, it is known to produce parts of vehicle bodies out of highly hardenable steel sheets in order to insure a sufficient stability of the passenger compartment. In this connection, high-strength steels have the advantage that because of the high load-bearing capacity, it is possible to reduce the dimensions and thus also the weight, which reduces fuel consumption.

High-strength steel types that are embodied in this way include, for example, manganese-boron alloyed steels, for example 22MnB5, which is the steel most often used for this purpose.

High-strength steel types of this kind are processed using the so-called press-hardening process in which these steel types are heated to such high temperatures that the originally ferritic-perlitic steel structure is transformed into an austenitic structure. This austenitic high-temperature structure of the iron enables it to be transformed into a martensitic structure by means of a quenching at a speed greater than the critical hardening speed. Because of the different carbon solubilities of austenite and martensite, a lattice distortion occurs in this case, which enables a high hardness of up to greater than 1500 MPa. This hardening process has been known for a long time and is used correspondingly often.

In press hardening, such components can basically be produced in two different ways, with a distinction being drawn between the direct and indirect process.

In the direct process, a flat sheet bar is austenitized and then formed and quenched in a press hardening tool in one stroke or several strokes.

This process is relatively advantageous, but does not always permit highly complex geometries to be removed from the mold.

In the indirect process, first a component is produced from a flat sheet bar by cold forming, which also permits complex geometries. After this, the formed component is austenitized and then quenched in a press hardening tool, usually without also undergoing more extensive shaping procedures. The forming tool thus has a contour corresponding to that of the already formed component and is used only for the hardening.

Steel sheets of this kind that are used for the press hardening can be embodied simply in the form of sheet bars with an anti-corrosion coating. The usual anti-corrosion coatings in this connection are a zinc coating, a zinc alloy coating, an aluminum coating, or an aluminum alloy coating.

It is also known to use assembled sheet bars, so-called tailored blanks, in which either different steel types are welded together or the same steel types but with different thicknesses are welded together.

Coated starting sheet bars are naturally also an option here so that for example two sheets made of 22MnB5 with different thicknesses and an aluminum-silicon coating are welded to each other.

Particularly when welding aluminum-silicon-coated sheets, however, it has been ascertained that aluminum from the coating clearly migrates into the weld seam. The aluminum in the weld seam adversely affects the martensite transformation or martensite formation; in addition, aluminum causes the formation of intermetallic phases, which are relatively hard inherently, but are also very brittle and can therefore be a source of cracking.

In order to avoid this problem when welding tailored blanks, it is known to remove aluminum layers in some regions on both sides of a planned butt-welding joint prior to welding in order to prevent aluminum-silicon from being able to infiltrate the weld seam.

The disadvantage here is that in this case, there is no corrosion protection in the region of the weld seam and particularly with the heating for hardening purposes, the weld seam and the edges adjacent to the weld seam can subsequently develop scale and decarbonize. Another disadvantage here is that these methods for removing the aluminum-silicon coatings constitute an additional processing step that is also not easy to control.

DE 10 2012 111 118 B3 has disclosed a method for laser welding one or more workpieces of press-hardenable steel, in particular manganese-boron steel, in which the welding is performed in the butt joint and in which the workpiece or workpieces have a thickness of at least 1.8 mm and/or a thickness increase of at least 0.4 mm is produced at the butt joint; during the laser welding, a filler wire is introduced into the melt pool produced with a laser beam. In order to insure that the weld seam can be reliably hardened into a martensitic structure during the hot-forming, this document provides adding at least one alloying element from the group comprising manganese, chromium, molybdenum, silicon, and/or nickel to the filler wire, which promotes the formation of austenite in the melt pool produced with the laser beam; this at least one alloying element is present in the filler wire with a mass fraction that is at least 0.1 percent by weight greater than in the press-hardenable steel of the workpiece or workpieces.

DE 10 2014 001 979 A1 has disclosed a method for laser welding one or more workpieces of hardenable steel in the butt joint; the steel is in particular a manganese-boron steel and the workpieces have a thickness of between 0.5 and 1.8 mm and/or a thickness increase of between 0.2 and 0.4 mm is produced at the butt joint; during the laser welding, a filler wire is introduced into the melt pool; and the melt pool is produced exclusively by the one laser beam. In order to insure that the weld seam can be reliably hardened into a martensitic structure during the hot-forming, this document provides that the filler wire contains at least one alloying element from the group comprising manganese, chromium, molybdenum, silicon, and/or nickel so as to promote the formation of austenite.

EP 2 737 971 A1 has disclosed a tailor welded blank and a method for producing it; the sheet is produced in such a way that sheets of different thicknesses or compositions are connected to each other, the intent of this being to reduce quality problems in the welding zone. Here, too, a filler wire is used, which should be embodied so that no ferrite is produced in the temperature range from 800 to 950° C. This method should in particular be suitable for AlSi-coated sheets; this wire, too, should have a higher content of austenite-stabilizing elements, which particularly consist of carbon or manganese.

EP 1 878 531 B1 has disclosed a method for laser arc hybrid welding surface-coated metallic workpieces, the intent being for the surface coating to contain aluminum. The laser beam should be combined with at least one arc so that a melting of the metal and a welding of the part or parts is produced and so that before being welded, at least one of the parts has deposits of the aluminum-silicon coating on the surface of one of its lateral cut surfaces that are to be welded.

EP 2 942 143 B1 has disclosed a method for joining two blanks; the blanks are steel sheets with a coating, which comprises a layer of aluminum or of an aluminum alloy; the two parts are welded to each other using a laser beam and an arc; the arc torch includes a filler wire electrode and the filler wire electrode consists of a steel alloy that comprises stabilizing elements; the laser and arc are moved in a welding direction; and the arc welding torch is positioned in front of the laser beam in the welding direction.

EP 2 883 646 B1 has disclosed a method for joining two blanks, at least one of the blanks comprising a layer of aluminum or an aluminum alloy; during the welding procedure, a metal powder is supplied to the welding zone and the metal powder is an iron-based powder comprising gamma-stabilizing elements and the laser beam welding is a twin spot laser beam welding.

EP 2 007 545 B1 has disclosed a method for producing a welded part with very good mechanical properties; a steel sheet has a coating that consists of an intermetallic layer and a metal alloy layer provided on the intermetallic layer. In order to weld the sheets, the metal alloy layer on the intermetallic layer should be removed at the periphery of the sheet, i.e. in the regions that are to be welded, this layer being an aluminum alloy layer. This coating should be removed by means of a laser beam so that prior to the welding, this layer, which is embodied as an aluminum-silicon layer, is vaporized in order to avoid detrimental influences of the aluminum in the weld seam. At the same time, the intermetallic layer should remain in place in order to potentially provide corrosion-preventing effects.

WO 2017/103149 A1 has disclosed a welding method in which two separately produced laser beams are guided along a planned weld seam; the first laser beam is used to melt a flux-cored wire while the purpose of the second laser is to insure a mixing of the melt pool through a rotating motion. This is done in order to insure the melting of the filler material on the one hand and the mixing of the filler material on the other. In addition, a method is disclosed in which a leading laser beam is produced, which melts the flux-cored wire, while a following laser beam is split into two laser beams, which are guided one after another along the weld seam; it is explained that a movement of these laser beams is not required in this case.

WO 2019/030249 A1 has disclosed a welding method in which two aluminum-silicon-coated sheets are joined to each other by means of a laser this laser rotates in order to mix a weld pool during the welding process.

With WO 2017/103149 A1, it is disadvantageous that the equipment technology is extraordinarily expensive; it also turns out that with the disclosed serial dual focus with wire, a sufficient homogenization effect does not take place.

DE 10 2017 120 051 A1 has disclosed a method for laser beam welding one or more steel sheets made of press-hardenable manganese-boron steel in which at least one of the steel sheets has a coating comprised of aluminum; the laser beam welding is performed by supplying a filler wire into the melt pool that is produced exclusively by means of a laser beam. The filler wire should contain at least one austenite-stabilizing alloying element. The goal of the method is to achieve the fact that—with a relatively low energy consumption and high productivity—after the hot forming, the weld seam has a strength comparable to that of the base material. To achieve this, it is proposed for the laser beam to be set into oscillation in such a way that it oscillates transversely to the welding direction, the oscillation frequency of the laser beam being at least 200 Hz, preferably at least 500 Hz. The purpose of this is to eliminate the need for the removal of the aluminum coating at the periphery of the sheet edges that are to be welded.

JP 2004 000 1084 has disclosed a welding method in which in order to improve the gapbridging capability and to improve deep welding, a laser welding method and an arc welding method are combined with each other; it is possible to embody the laser as a laser with two beams, with the welding device being designed to cause the two beams to rotate around each other.

DE 10 2014 107 716 B3 has disclosed a welding method in which in order to reduce the occurrence of weld spatter, during the welding, the laser beam that is performing the welding, as it executes the advancing motion, is set into a superimposed, three-dimensionally oscillating motion; the oscillating motion is executed parallel or perpendicular to the butt joint.

In the above-mentioned methods, it is disadvantageous that stable weight-bearing weld seams cannot be reliably produced in practice and for unknown reasons, there are frequently large differences in the final strength of the weld seams.

The object of the invention is to create a welding method and to produce weld seams with reproducible mechanical properties.

SUMMARY OF THE INVENTION

The object is attained with a method having the features described and claimed herein. Advantageous modifications are disclosed and claimed herein.

According to the invention, it has been discovered that in methods in which one laser beam melts the wire while two following laser beams introduce additional energy into the melt pool, for unknown reasons, the weld seams frequently have very different properties.

The invention has led to the discovery that in a method in which stirring is performed by a single laser, but wire is used, even with an optimal mixing of the aluminum from the coating in the melt pool, there is still enough available aluminum mathematically speaking to render the weld seams insufficiently hardenable, particularly in the case of small sheet thicknesses.

It has also been ascertained that oscillating single-spot lasers are quite clearly unable to guarantee a consistent weld seam quality.

According to the invention, the naturally existing melt pool current is superimposed with an additional forced current, which is produced by the rotation of a twin laser beam, in order to thus distribute the filler wire and the aluminum from the coating homogeneously in the weld seam.

The invention has led to the discovery that there is a relationship between the rotation frequency and the welding speed, without which a desired stirring effect cannot be achieved. It has also turned out to be advantageous for both the spot diameter and the spot spacing to be set in a defined way in order to further improve the desired effects.

According to the invention, at least two laser beams, in particular two sub-laser beams, are provided, which rotate in the weld pool. In this connection, the welding lasers can for example rotate symmetrically around the weld pool center or can rotate asymmetrically around the weld pool center, wherein one welding beam or laser beam rotates with a smaller radius around the weld pool center while a second welding beam or laser beam rotates with a larger radius around the weld pool center.

In another possible embodiment, one laser beam moves along the weld pool center while a second welding beam or laser beam oscillates or rotates orbitally around the first welding beam. The invention has led to the discovery that the advancing speed and stirring effect must in particular be matched to each other. The stirring effect in this case is defined as the number of rotations divided by the advancing distance. With an incorrect combination of the advancing speed and stirring effect, negative effects such as humping, powerful spatter formation, and even perforation of the weld seam occur. An advancing speed that is too low can adversely affect the economic feasibility of the process.

The invention thus relates to a method for welding coated steel sheets, particularly steel sheets coated with an aluminum-silicon metallic coating layer, wherein a configuration of two laser beams is provided, wherein the laser beams act on a weld pool that is to be formed, wherein at least one laser beam rotates around a rotation axis so that the laser beams execute a movement relative to each other, wherein the laser beams are guided along a welding axis, wherein in order to achieve a mixing of the weld pool, a defined stirring effect and a defined welding speed in relation to each other are adhered to, wherein the following condition applies to the stirring effect:

$$\eta = \frac{f_{rot}}{v_w}$$

where $f_{rot}$ is the rotation frequency and $v_w$ is the welding speed and wherein the following conditions apply:

$$4 \leq \eta \leq \frac{120}{v_w}\left[\frac{1}{mm}\right]$$

$$4 \leq v_w \leq 14\left[\frac{m}{min}\right]$$

In one embodiment of the invention, the laser beams are positioned symmetrically around a rotation axis and rotate around the rotation axis in diametrically opposed positions or one laser beam is guided along a welding axis and the other laser beam rotates around the first laser beam or a first laser beam rotates with a first smaller radius around the rotation axis while the second laser beam rotates with a larger radius around the rotation axis or a mixture of these forms of movement.

In one embodiment, with a symmetrical rotation of the laser beams or more precisely of their projected areas or spots, the laser beams are each spaced apart from the center by the spot spacing $x_{df}$, wherein the spot diameter or the diameter of the laser beam $d_f$ is 0.1 mm to 1 mm, wherein the total coverage width of the laser beams is the sum of the spacing of the spot centers from each other plus one spot diameter, wherein the total is between 0.5 mm and 2.5 mm.

In this embodiment, it is particularly advantageous that for the spot spacing $x_{df}$, the following condition applies:

$$x_{df} \geq 0.8 * d_f.$$

In a subsequent embodiment, in a laser beam configuration, two laser beams are positioned orbitally, wherein a first laser beam remains along the weld advancing direction on a central axis of the weld pool, namely the welding axis, while the second laser beam or second spot rotates around a rotation axis, wherein the rotation axis lies on the welding axis or oscillates around the welding axis and constitutes the center point of the first spot.

In this embodiment, it is particularly advantageous if the spot diameter is between 0.1 and 1 mm, wherein the following conditions apply:

$$x_{df} \geq 0.8 * d_f \text{ and}$$

$$0.45 \text{ mm} \leq x_{df} + \frac{d_f}{2} \leq 1.5 \text{ mm}$$

In a next embodiment, in a laser beam configuration, two laser beams or two laser spots rotate around a rotation axis, wherein a first laser beam or first laser spot rotates with a first radius around the rotation axis and the second laser beam or second laser spot rotates with a second radius around the rotation axis, wherein one of the radii is greater than the other, wherein the following conditions apply:

$$0.45 \text{ mm} \leq x_{df} - x_{off} + \frac{d_f}{2} \leq 1.5 \text{ mm}$$

$$x_{df} \geq 0.8 * d_f$$

$$0 < x_{off} < \frac{x_{df}}{2}$$

where $x_{off}$ corresponds to the distance of the first laser beam from the rotation axis and therefore defines the eccentricity of the laser beams relative to each other.

In the above-mentioned embodiments, it is advantageous if the welding is performed with a laser power of between 2 and 10 kW, in particular from 3 to 8 kW, and preferably from 4 to 7 kW.

It is also advantageous if the stirring effect $\eta$ in $mm^{-1}$ is between 4 and 30 $mm^{-1}$.

In another embodiment, the welding speed $v_w$ is between 5 and 12 m/min, in particular between 6 and 10 m/min.

The optimal process window for the stirring effect is also dependent on the welding speed $v_w$.

Advantageously, a steel that is a boron-manganese steel is used as the base material, which can be hardened by means of an austenitization and quenching process, particularly preferably to a tensile strength of greater than 900 MPa and in particular, a steel is used that belongs to the group of CMnB steels, for example a 22MnB5 or 20MnB8 steel.

In this connection, it is advantageous if a steel of the following general alloy composition (in % by mass) is used as the base material:

| | |
|---|---|
| carbon (C) | 0.03-0.6 |
| manganese (Mn) | 0.3-3.0 |
| aluminum (Al) | 0.01-0.07 |

-continued

| | |
|---|---|
| silicon (Si) | 0.01-0.8 |
| chromium (Cr) | 0.02-0.6 |
| nickel (Ni) | <0.5 |
| titanium (Ti) | 0.01-0.08 |
| niobium (Nb) | <0.1 |
| nitrogen (N) | <0.02 |
| boron (B) | <0.02 |
| phosphorus (P) | <0.01 |
| sulfur (S) | <0.01 |
| molybdenum (Mo) | <1 | residual iron and smelting-related impurities.

More advantageously, a steel of the following general alloy composition (in % by mass) can be used as the base material:

| | |
|---|---|
| carbon (C) | 0.03-0.36 |
| manganese (Mn) | 0.3-2.00 |
| aluminum (Al) | 0.03-0.06 |
| silicon (Si) | 0.01-0.20 |
| chromium (Cr) | 0.02-0.4 |
| nickel (Ni) | <0.5 |
| titanium (Ti) | 0.03-0.04 |
| niobium (Nb) | <0.1 |
| nitrogen (N) | <0.007 |
| boron (B) | <0.006 |
| phosphorus (P) | <0.01 |
| sulfur (S) | <0.01 |
| molybdenum (Mo) | <1 | residual iron and smelting-related impurities.

The invention also relates to a sheet bar comprising a first steel sheet and a second steel sheet, which are welded to each other in accordance with the above-mentioned method.

In one embodiment, it is advantageous if the steel sheets have different alloy compositions.

BRIEF DESCRIPTION OF THE DRAWINGS

The invention will be explained based on the drawings. In the drawings:

FIG. 4: is a table showing 16 different tests in the comparison of embodiments that are according to the invention and embodiments that are not according to the invention;

DETAILED DESCRIPTION OF THE INVENTION

Figure 1A:
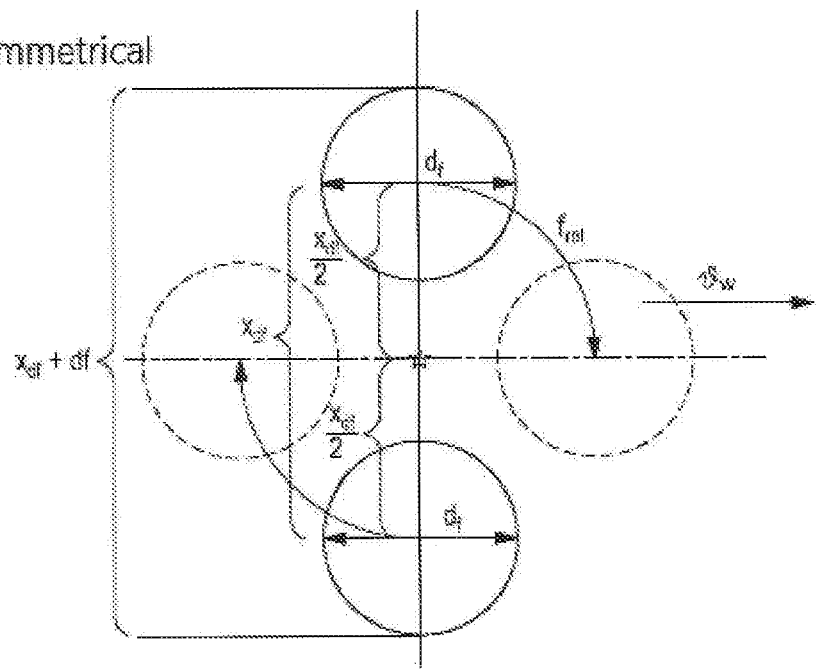
FIG. 1: schematically depicts the symmetrical, asymmetrical, and orbital rotation of the welding laser beams.
Figure 1B:
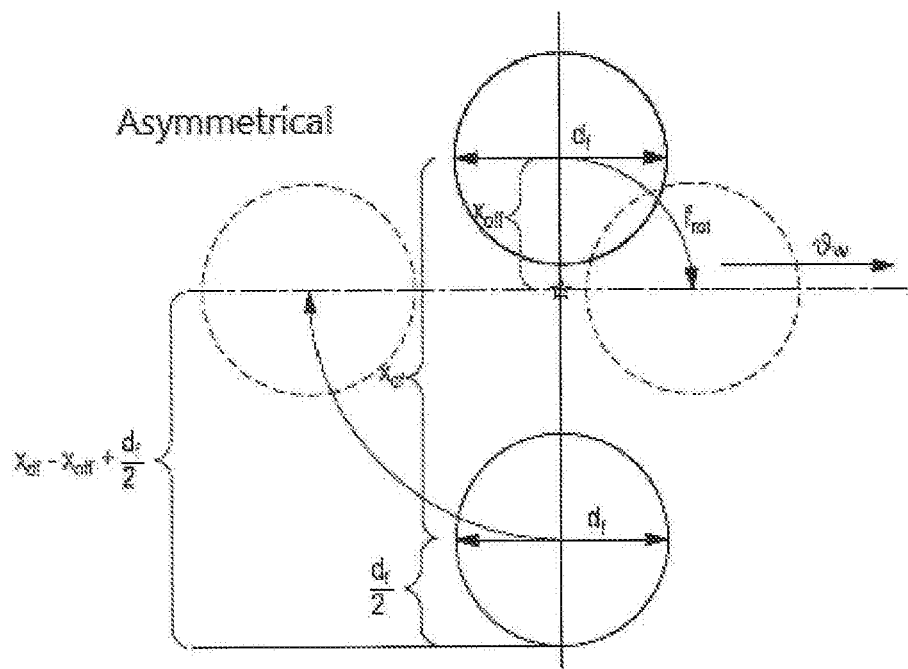
Figure 1C:
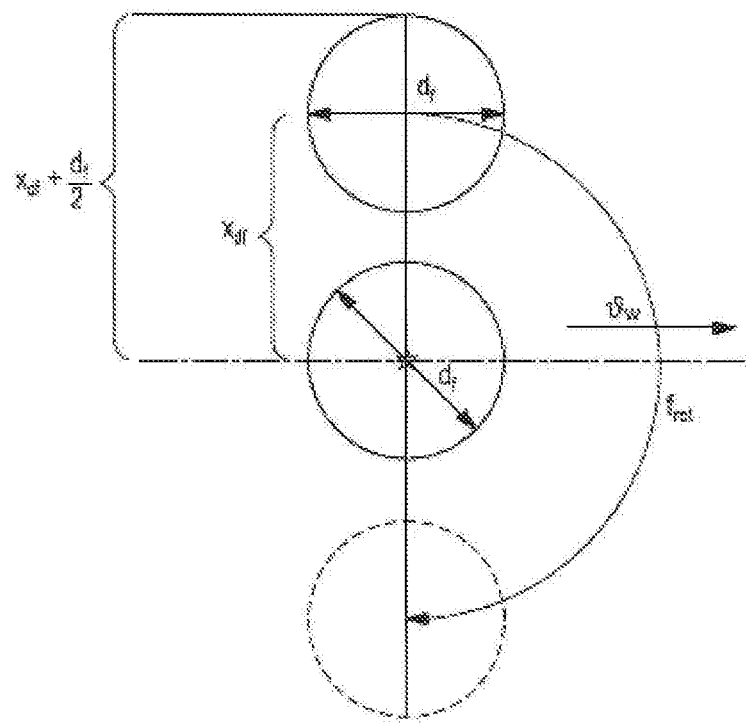

FIG. 1 shows three different principally possible and also mutually combinable laser beam configurations, wherein in the laser beam configurations shown, with a symmetrical configuration (FIG. 1a), the laser beams are positioned symmetrical to a rotation axis and in this case, are rotated at diametrically opposed positions around the rotation axis.

The symmetrical configuration can advantageously achieve the maximum stirring effect.

With an asymmetrical apparatus (FIG. 1b), one laser beam is positioned closer to the rotation axis than the other so that an eccentricity is produced. The asymmetrical apparatus advantageously makes it possible to influence the desired weld seam geometry.

With the orbital apparatus (FIG. 1c), a central laser beam is provided, which is moved along a weld advancing direction while the second laser beam, which is spaced apart from this central one, rotates around it and around the rotation axis.

The orbital apparatus can advantageously have a compensating effect on possible differences in sheet thickness.

Figure 5:
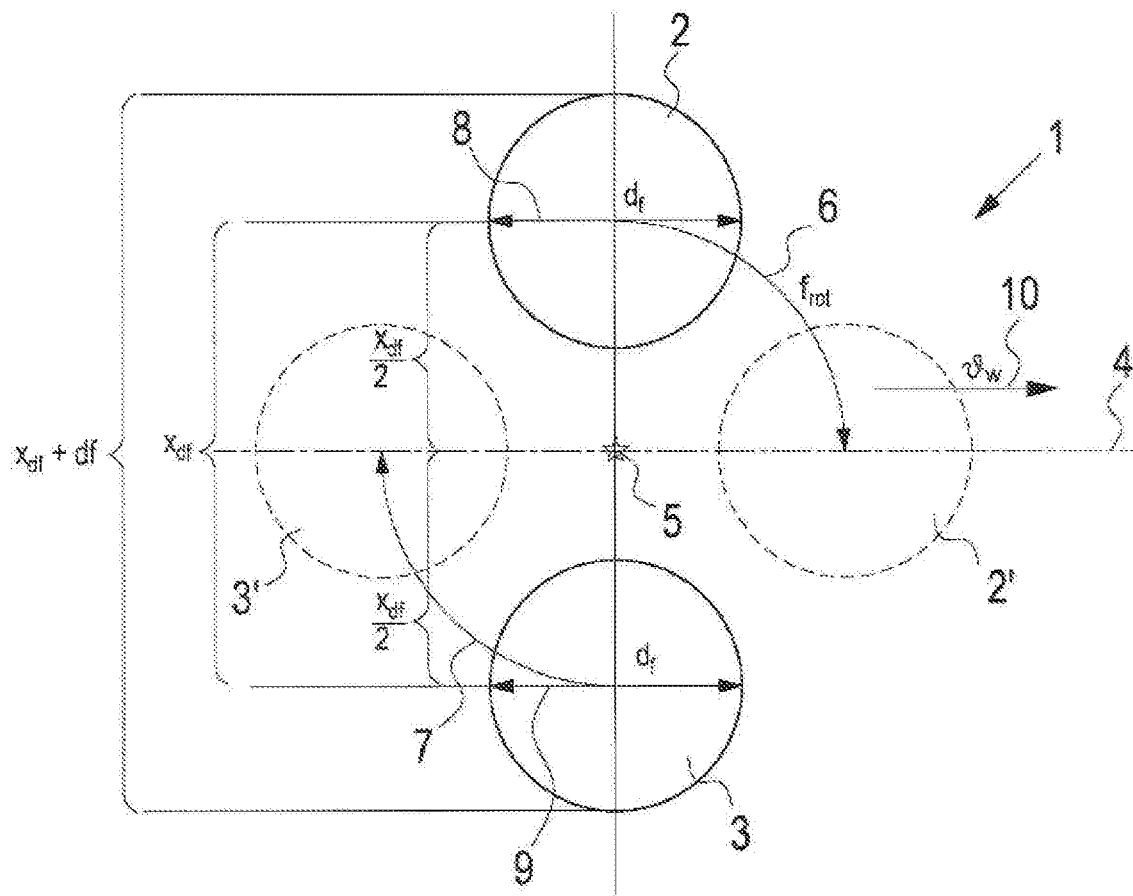
FIG. 5: depicts of a symmetrical stirring apparatus with the functions of the spot spacing and the spot diameter relative to each other.

FIG. 5 shows the symmetrical stirring apparatus in greater detail.

With this laser beam configuration 1, there are two laser beams 2, 3, which are each spaced about the same distance apart from an idealized weld pool center 4. Preferably, the ideal weld pool center 4 also coincides with the rotation axis 5 around which the two laser beams 2, 3 rotate in accordance with the rotation directions 6, 7. Accordingly, sample sequential positions 2', 3' that are offset by 90° are shown. The laser beams 2, 3 or more precisely, their projected areas (spots) have a given diameter $d_f$ corresponding to the expansion arrows 8, 9.

The two laser beams 2, 3 or more precisely, their projected areas (spots), viewed from the center, are respectively spaced apart by the spot spacing $x_{df}$. The theoretical weld pool width thus equals the spot spacing plus one half of each spot diameter. The weld advancing movement takes place in accordance with the arrow 10 along the idealized weld pool center 4 at a weld advancing speed $v_w$.

With this configuration of a symmetrically rotating apparatus, the spot diameter df preferably lies in a range from 0.1 to 1 mm.

Figure 6:
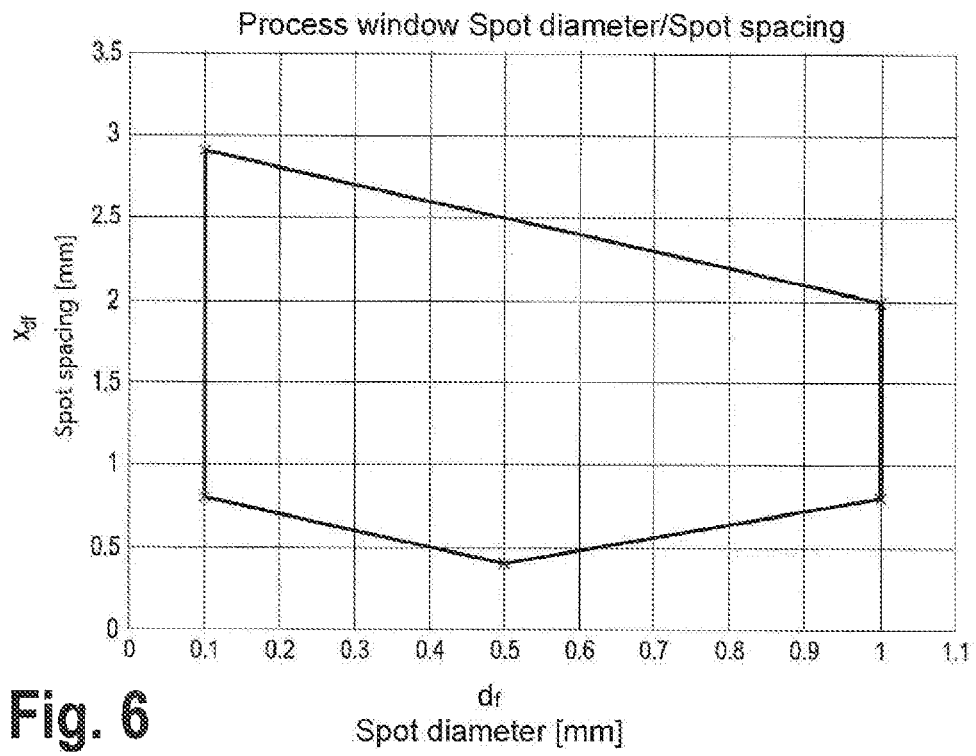
FIG. 6: shows the process window with a symmetrical stirring apparatus.

The spacing of the spot centers from each other plus the spot diameter is preferably between 0.5 mm and 3 mm, in particular from 0.9 mm to 2.5 mm, wherein for the spot spacing $x_{df}$, preferably the following condition applies: $x_{df} \geq 0.8 * d_f$ FIG. 6 shows a suitable process window for the symmetrical stirring apparatus with regard to the relationship between the spot spacing and diameter. As explained above, the spot diameter df is as a rule between 0.1 and 1 mm.

Figure 7:
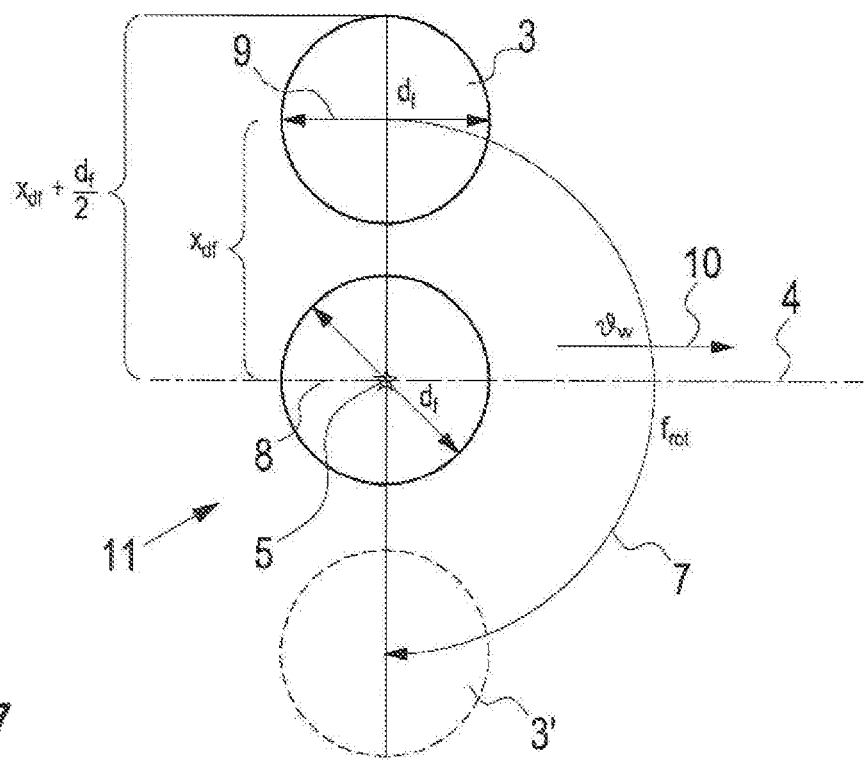
FIG. 7: is a schematic depiction of an orbital stirring apparatus with the functions of the spot spacing and the spot diameter.

In another advantageous laser beam configuration 11 (FIG. 7), two laser beams 2, 3 are orbitally positioned, which means that a first spot 2, in accordance with the weld advancing direction 10, remains on the welding axis 4 while a second spot 3 rotates around a rotation axis 5, which lies on the welding axis 4 and constitutes the center point of the first spot 2.

The rotation of the second spot 3 correspondingly occurs along the rotation direction 7, which is positioned at a particular radius around the rotation axis 5. By way of example in FIG. 7, the different positions of the second laser spot 3 are shown here as rotated by 180° with the position 3'. But full rotations are executed during the welding along the weld advancing direction 10.

The welding axis 4 simultaneously also constitutes the idealized weld pool center 4.

In this advantageous embodiment, the spot diameter likewise is between 0.1 and 1 mm, wherein the following condition applies here: 0.45 mm$\leq x_{df}+d_f/2\leq 1.5$ mm.

Figure 8:
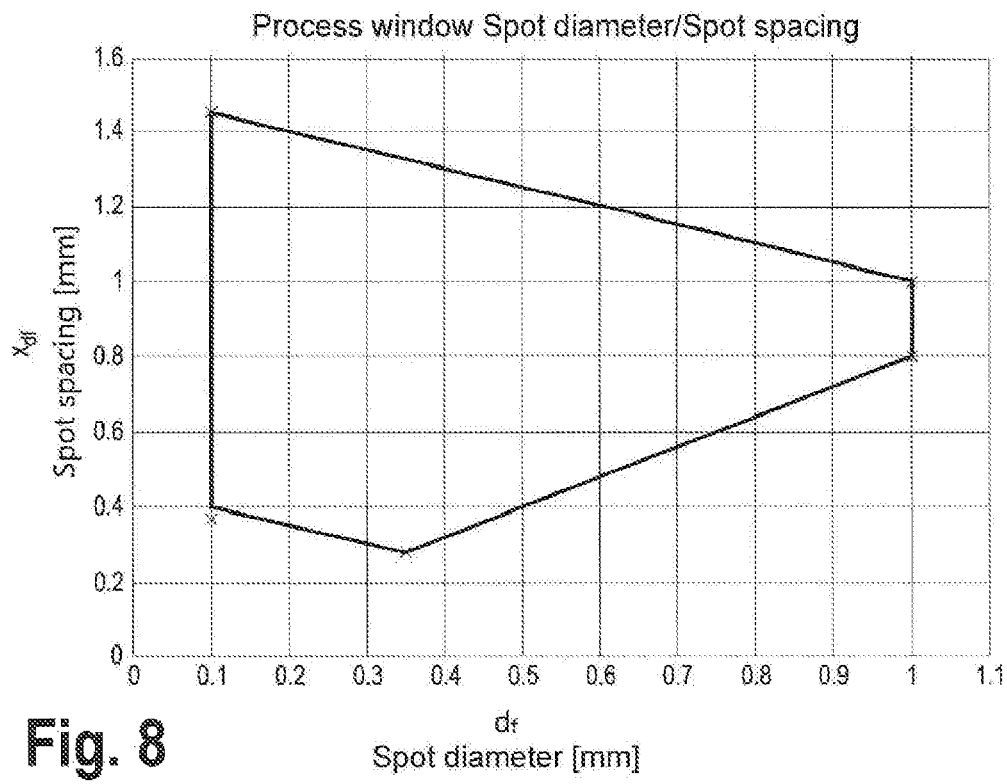
FIG. 8: shows the process window of the orbital stirring apparatus.

The condition $x_{df}\geq 0.8*d_f$ also applies here. FIG. 8 shows the process window that applies to the orbital stirring apparatus in accordance with the above-mentioned basic conditions, wherein the function of the spot spacing over the spot diameter is indicated in the process window and the corresponding region according to the invention is located within the enclosed area.

Figure 9:
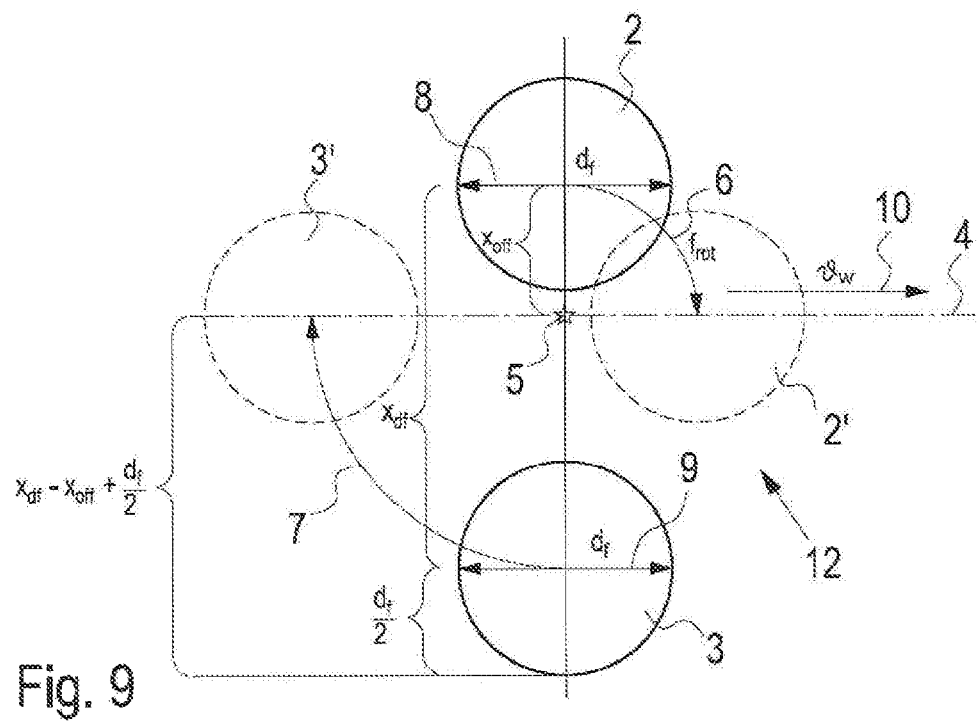
FIG. 9: depicts an asymmetrical stirring apparatus with the functions of the spot spacing, the spot diameter, and the eccentricity.

In another advantageous embodiment of a laser beam configuration 1 (shown in FIG. 9), two laser spots 2, 3 once again rotate around a rotation axis 5, but a first rotation direction 6 of a first laser beam 2 or first laser spot 2 is positioned closer to the rotation axis than the second rotation direction 7 of the second laser beam 3. The spot spacing center is thus spaced apart from the weld pool center 4 or more precisely, is positioned offset from it.

In this advantageous embodiment, the spot diameter df is once again between 0.1 and 1 mm, wherein for this, the following conditions are additionally met:

$$0.45 \text{ mm} \leq x_{df} - x_{off} + \frac{d_f}{2} \leq 1.5 \text{ mm}$$

$$x_{df} \geq 0.8 * d_f$$

$$0 < x_{off} < \frac{x_{df}}{2}$$

Figure 2:
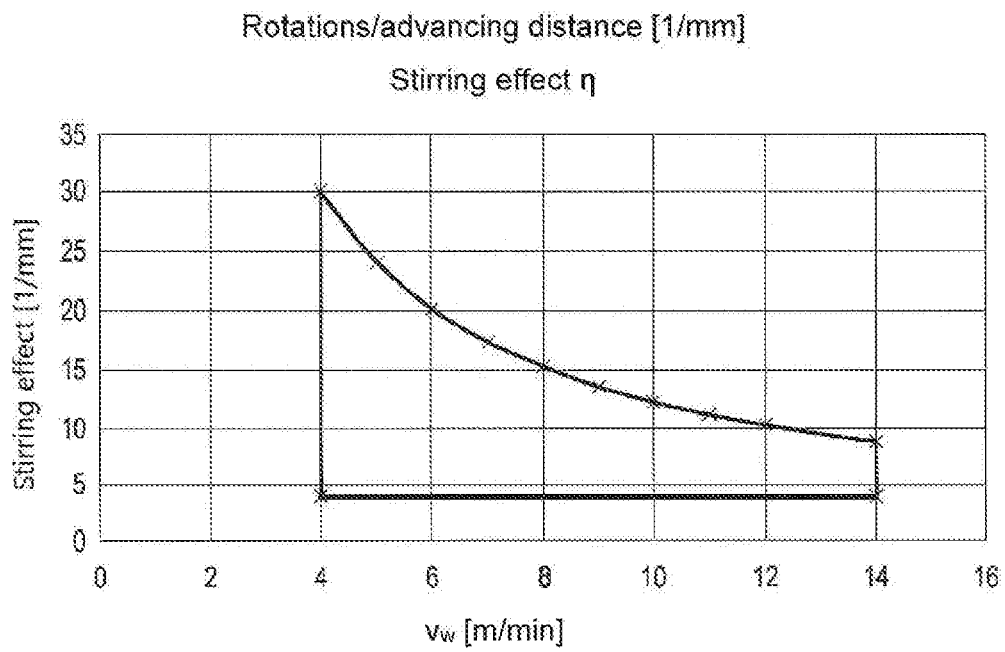
FIG. 2: shows the process window according to the invention as it relates to the stirring effect.
Figure 3:
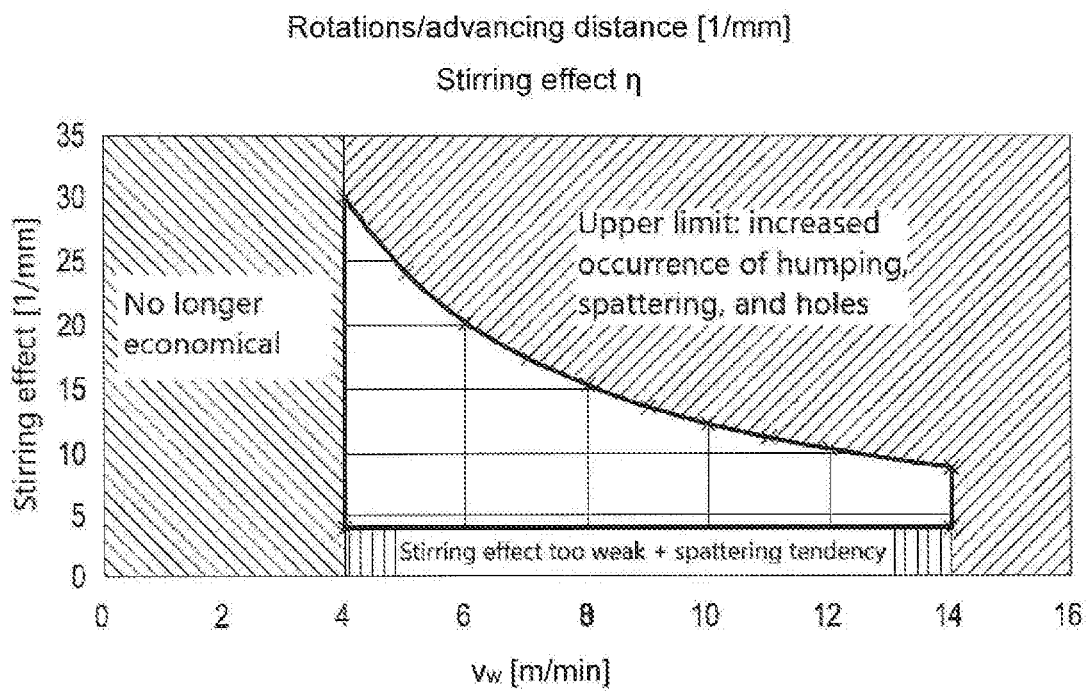
FIG. 3: shows the depiction from FIG. 2 with the meaning of the outlying regions provided.

FIG. 2 shows the process window according to the invention with regard to the stirring effect. In this connection, FIG. 3 shows the respective effects when the process is carried out with unsuitable parameters, i.e. ones that lie outside the process window.

The selection of an excessively powerful stirring effect in combination with a high welding speed can result in humping (unstable welding process), increased occurrence of spattering, and even perforation of the laser weld seam.

Surprisingly, even with a stirring effect that is too weak, the spattering tendency can increase sharply.

A laser welding speed ($v_w$) of less than 4 m/min is in fact technically possible, but is no longer worthwhile economically.

The table in FIG. 4 shows sixteen welding tests; the welding tests were performed with different weld advancing speeds, different stirring effects, and different power levels. After the hardening, the weld seams were examined and classified according to their weld seam homogeneity and process stability. The abbreviation "n.a." stands for "not assessable" since in these tests, a stable weld seam could not be produced.

Figure 10:
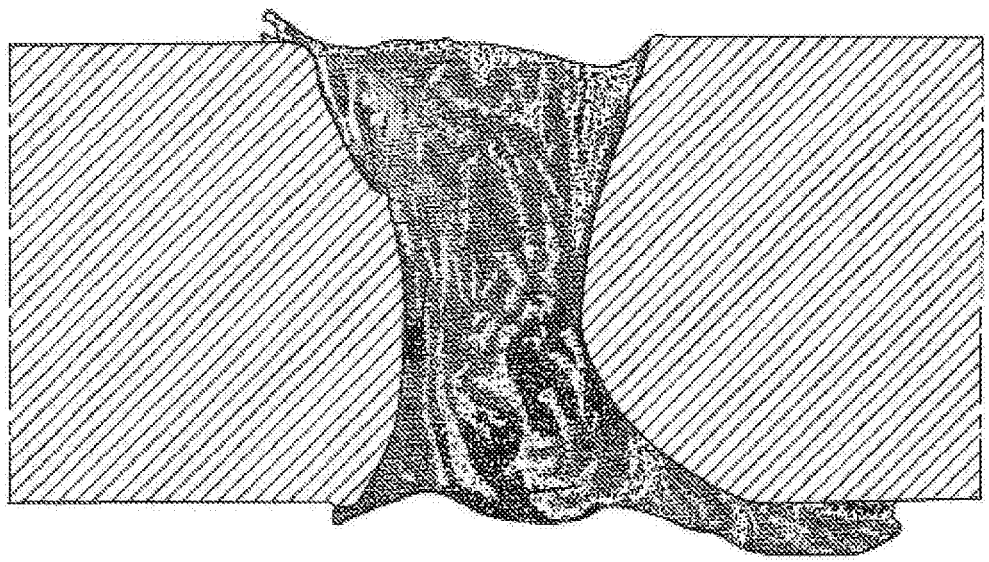
FIG. 10: shows a hardened weld seam in a polished micrograph depiction according to test T1 in the table.

FIG. 10 shows a weld seam structure after the hardening (example T1 from the table in FIG. 4) in which the parameters according to the invention were not adhered to. Based on visual inspection alone, the weld seam structure clearly lacks homogeneity after the hardening; the weld advancing speed here was 6 m per minute. The spot diameter was 0.3 mm, but with a spot spacing of 0, which means that only a single laser was used. It is clear that with this conventional method, it is not possible to achieve a qualitatively satisfactory result.

Figure 11:
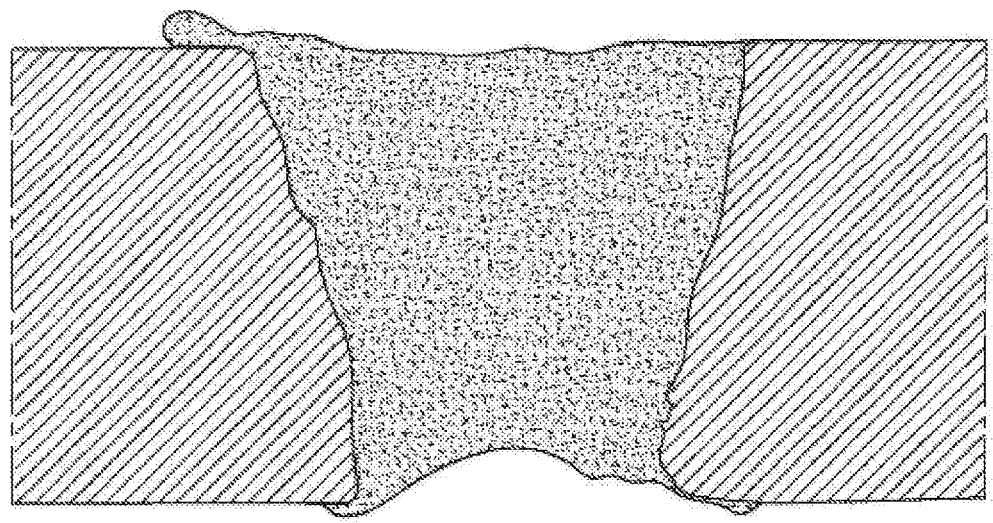
FIG. 11: shows a polished micrograph according to test T2 in the table.

FIG. 11 shows the result of an embodiment according to the invention (example test 2 from the table in FIG. 4); the polished micrograph after the hardening is homogeneous. The spot diameter here was 0.3 mm; a symmetrical stirring apparatus was used in which the spot spacing was 0.9 mm.

The laser power was 4.3 kW and the weld advancing speed was 6 m per minute. The stirring effect η was 4.125 mm$^{-1}$, the stirring effect being the quotient of the rotation frequency and the welding speed or more precisely the weld advancing distance.

The distance of the spot center from the rotation axis was 0.45 mm, which means that the spots orbited the rotation axis on a radius.

Figure 12:
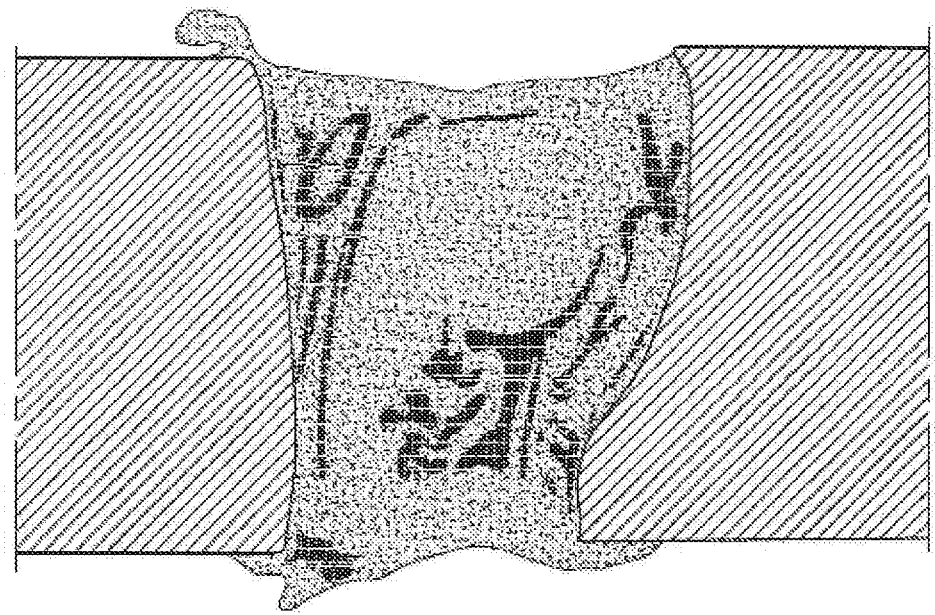
FIG. 12: shows a polished micrograph of the weld seam according to test T4 in the table.

FIG. 12 shows test 4, which is not according to the invention. The spot diameter and the spot spacing do lie within a range according to the invention as does the weld advancing speed, which at 6 m per minute corresponds to that of test 2, and the distance of the spot center from the rotation axis is indeed also the same, but the stirring effect, as the quotient of the rotation frequency and weld advancing speed, is too weak so that the polished micrograph after the hardening exhibits a clear lack of homogeneity.

Figure 13:
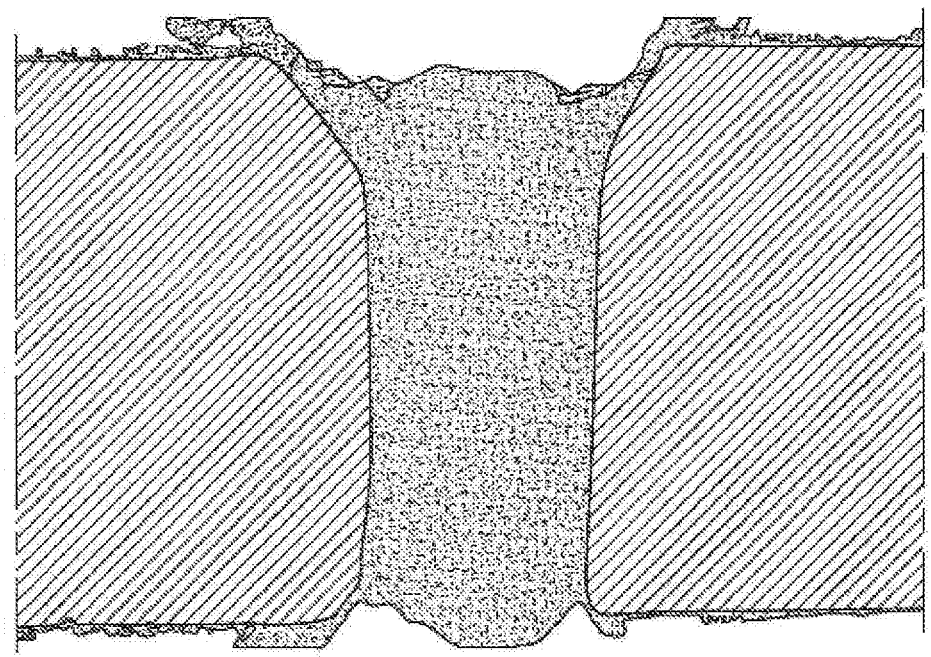
FIG. 13: shows a cross-section through a weld seam in a polished micrograph according to test T16 in the table.

FIG. 13 shows the result of test 16 according to the invention. It is clear that a homogeneous weld seam structure is present. The spot spacing in this case was 0.4 mm with a spot diameter of 0.3 mm, wherein the advancing speed corresponded to that of the other tests. The stirring effect η, at 4.125 mm$^{-1}$, lies within the range according to the invention; the distance of the spot center from the rotation axis was 0.2 mm.

With the invention, it is advantageous that through a specific selection of parameters and a corresponding process control, homogeneous weld seams can be reliably achieved when welding aluminum-silicon-coated sheets.

The invention claimed is:

1. A method for welding coated steel sheets, comprising the steps of:
   providing a configuration (1, 11, 12) of first and second laser beams (2, 3), wherein the laser beams act on a weld pool that is to be formed, at least one laser beam (3) rotates around a rotation axis (5) so that the laser beams (2, 3) execute a movement relative to each other, the laser beams (2, 3) are guided along a welding axis (4); and
   achieving a mixing of the weld pool by adhering to a defined stirring effect and a defined welding speed in relation to each other are adhered to, wherein the following condition applies to the stirring effect (n):

$$\eta = \frac{f_{rot}}{v_w}$$

and is between 4 mm$^{-1}$ and 30 mm$^{-1}$
where $f_{rot}$ is the rotation frequency and $v_w$ is the welding speed and wherein the following conditions apply:

$$4 \leq \eta \leq \frac{120}{v_w}\left[\frac{1}{\text{mm}}\right]$$

and $$4 \leq v_w \leq 14 \left[\frac{m}{min}\right].$$

2. The method according to claim 1, further comprising the steps of a) positioning the laser beams (2, 3) symmetrically around the rotation axis (5) and rotating the laser beams (2, 3) around the rotation axis (5) in diametrically opposed positions, or b) guiding the first laser beam (2) along a welding axis and rotating the second laser beam (3) around the first laser beam (2), or c) rotating the first laser beam (2) with a first smaller radius around the rotation axis (5) and rotating the second laser beam (3) with a larger radius around the rotation axis (5), or d) a combination of a), b) and/or c).

3. The method according to claim 1, further comprising the step of rotating the laser beams (2, 3) symmetrically relative to projected areas or spots, wherein the laser beams (2, 3) are each spaced apart from a spot center by a spot spacing $x_{df}$, each laser beam has a diameter $d_f$ of 0.1 mm to 1 mm, and the laser beams (2, 3) have a total coverage width defined by a sum of a spacing of the spot centers from each other plus one spot diameter, wherein the total coverage width is between 0.5 mm and 2.5 mm.

4. The method according to claim 3, wherein the spot spacing $x_{df} \geq 0.8 * d_f$.

5. The method according to claim 2, wherein in the configuration (11), the first and second laser beams (2, 3) are positioned orbitally, the first laser beam (3) remains along a weld advancing direction (10) on a central axis of the weld pool, while the second laser beam (3) rotates around the rotation axis (5), and the rotation axis (5) lies on the welding axis (4) or oscillates around the welding axis (4) and constitutes the spot center of the first spot (2).

6. The method according to claim 4, wherein the spot diameter is between 0.1 and 1 mm and the following conditions apply:

$$x_{df} \geq 0.8 * d_f \text{ and}$$

$$0.45 \text{ mm} \leq x_{df} + \frac{d_f}{2} \leq 1.5 \text{ mm}.$$

7. The method according to claim 2, wherein in the configuration (12), two laser beams (2, 3) rotate around the rotation axis (5), the first laser beam (2) rotates with a first radius around the rotation axis (5), the second laser beam (3) rotates with a second radius around the rotation axis (5), one of the first radius and the second radius is greater than the other, and the following conditions apply:

$$0.45 \text{ mm} \leq x_{df} - x_{off} + \frac{d_f}{2} \leq 1.5 \text{ mm}$$

$$x_{df} \geq 0.8 * d_f$$

$$0 < x_{off} < \frac{x_{df}}{2}.$$

8. The method according to claim 1, wherein the welding is performed with a laser power of between 2 and 10 kW.

9. The method according to claim 1, wherein the welding speed $v_w$ is between 5 and 12 m/min.

10. The method according to claim 1, wherein at least one of the coated steel sheets comprises a boron-manganese steel base material which can be hardened by means of an austenitization and quenching process to a tensile strength of greater than 900 MPa.

11. The method according to claim 1, wherein at least one of the coated steel sheets comprises a steel base material having the following alloy composition in % by mass:

| | |
|---|---|
| carbon (C) | 0.03-0.6 |
| manganese (Mn) | 0.3-3.0 |
| aluminum (Al) | 0.01-0.07 |
| silicon (Si) | 0.01-0.8 |
| chromium (Cr) | 0.02-0.6 |
| nickel (Ni) | <0.5 |
| titanium (Ti) | 0.01-0.08 |
| niobium (Nb) | <0.1 |
| nitrogen (N) | <0.02 |
| boron (B) | <0.02 |
| phosphorus (P) | <0.01 |
| sulfur (S) | <0.01 |
| molybdenum (Mo) | <1 | residual iron and smelting-related impurities.

12. The method according to claim 1, wherein at least one of the coated steel sheets comprises a steel base material having the following alloy composition in % by mass:

| | |
|---|---|
| carbon (C) | 0.03-0.36 |
| manganese (Mn) | 0.3-2.00 |
| aluminum (Al) | 0.03-0.06 |
| silicon (Si) | 0.01-0.20 |
| chromium (Cr) | 0.02-0.4 |
| nickel (Ni) | <0.5 |
| titanium (Ti) | 0.03-0.04 |
| niobium (Nb) | <0.1 |
| nitrogen (N) | <0.007 |
| boron (B) | <0.006 |
| phosphorus (P) | <0.01 |
| sulfur (S) | <0.01 |
| molybdenum (Mo) | <1 | residual iron and smelting-related impurities.

13. A method of preparing a sheet bar comprising a first steel sheet and a second steel sheet, wherein the first steel sheet and the second steel sheet are welded to each other according to the following steps:
  providing a configuration (1, 11, 12) of first and second laser beams (2, 3), wherein the laser beams act on a weld pool that is to be formed, at least one laser beam (3) rotates around a rotation axis (5) so that the laser beams (2, 3) execute a movement relative to each other, the laser beams (2, 3) are guided along a welding axis (4); and
  achieving a mixing of the weld pool by adhering to a defined stirring effect and a defined welding speed in relation to each other are adhered to, wherein the following condition applies to the stirring effect (n):

$$\eta = \frac{f_{rot}}{v_w}$$

and is between 4 mm$^{-1}$ and 30 mm$^{-1}$
where $f_{rot}$ is the rotation frequency and $v_w$ is the welding speed and wherein the following conditions apply:

$$4 \leq \eta \leq \frac{120}{v_w}\left[\frac{1}{mm}\right]$$

and $$4 \leq v_w \leq 14 \left[\frac{m}{min}\right].$$

14. The method according to claim 13, wherein the first and second steel sheets have different alloy compositions.

15. The method according to claim 13, wherein at least one of the first and second steel sheets comprises a coated steel sheet.

16. The method according to claim 13, wherein at least one of the first and second steel sheets comprises a steel base material having the following alloy composition in % by mass:

| | |
|---|---|
| carbon (C) | 0.03-0.36 |
| manganese (Mn) | 0.3-2.00 |
| aluminum (Al) | 0.03-0.06 |
| silicon (Si) | 0.01-0.20 |
| chromium (Cr) | 0.02-0.4 |
| nickel (Ni) | <0.5 |
| titanium (Ti) | 0.03-0.04 |
| niobium (Nb), nitrogen(N, boron(B), phosphorus (P) and sulfur (S) together | 0.0-0.16 |
| molybdenum (Mo) | <1 | residual iron and smelting-related impurities.

17. A method of preparing a sheet bar comprising a first steel sheet and a second steel sheet, wherein the first steel sheet and the second steel sheet are welded to each other according to the following steps:
providing a configuration (1, 11, 12) of first and second laser beams (2, 3), wherein the laser beams act on a weld pool that is to be formed, at least one laser beam (3) rotates around a rotation axis (5) so that the laser beams (2, 3) execute a movement relative to each other, the laser beams (2, 3) are guided along a welding axis (4); and
achieving a mixing of the weld pool by adhering to a defined stirring effect and a defined welding speed in relation to each other are adhered to, wherein the following condition applies to the stirring effect (n):

$$\eta = \frac{f_{rot}}{v_w}$$

and is between 4 mm$^{-1}$ and 30 mm$^{-1}$ where $f_{rot}$ is the rotation frequency and $v_w$ is the welding speed and wherein the following conditions apply:

$$4 \leq \eta \leq \frac{120}{v_w}\left[\frac{1}{mm}\right]$$

and $$4 \leq v_w \leq 14\left[\frac{m}{min}\right];$$

wherein at least one of the first and second steel sheets comprises a steel base material having the following alloy composition in % by mass:

| | |
|---|---|
| carbon (C) | 0.03-0.36 |
| manganese (Mn) | 0.3-2.00 |
| aluminum (Al) | 0.03-0.06 |
| silicon (Si) | 0.01-0.20 |
| chromium (Cr) | 0.02-0.4 |
| nickel (Ni) | <0.5 |
| titanium (Ti) | 0.03-0.04 |
| niobium (Nb), nitrogen(N, boron(B), phosphorus (P) and sulfur (S) together | 0.0-0.14 |
| molybdenum (Mo) | <1 | residual iron and smelting-related impurities.

18. The method according to claim 17, wherein the first and second steel sheets have different alloy compositions.

19. The method according to claim 17, wherein at least one of the first and second steel sheets comprises a coated steel sheet.

* * * * *